United States Patent
Stern et al.

(10) Patent No.: US 7,030,353 B2
(45) Date of Patent: Apr. 18, 2006

(54) METHOD AND APPARATUS FOR CONTROLLABLY REDUCING POWER DELIVERED BY A LASER PROJECTION DISPLAY

(75) Inventors: Miklos Stern, Woodmere, NY (US); Paul Dvorkis, East Setauket, NY (US); Narayan Nambudiri, Kings Park, NY (US); Carl Wittenberg, Water Mill, NY (US); Chinh Tan, Setauket, NY (US); Ron Goldman, Cold Spring Harbor, NY (US); Dmitriy Yavid, Stony Brook, NY (US); Frederick F. Wood, Medford, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 0 days.

(21) Appl. No.: 10/836,813

(22) Filed: Apr. 30, 2004

(65) Prior Publication Data

US 2005/0175048 A1    Aug. 11, 2005

Related U.S. Application Data

(60) Provisional application No. 60/534,008, filed on Dec. 31, 2003.

(51) Int. Cl.
*G01J 1/32* (2006.01)

(52) U.S. Cl. ............................ 250/205; 250/235

(58) Field of Classification Search .................. None
See application file for complete search history.

(56) References Cited

U.S. PATENT DOCUMENTS

| 5,029,975 | A | 7/1991 | Pease .................. 350/96.27 |
| 5,311,321 | A | 5/1994 | Crowley .................... 348/760 |
| 5,614,961 | A | 3/1997 | Gibeau et al. ............. 348/750 |
| 5,715,021 | A | 2/1998 | Gibeau et al. ............. 348/750 |
| 5,920,361 | A | 7/1999 | Gibeau et al. ............. 348/750 |
| 6,002,505 | A | 12/1999 | Kraenert et al. |
| 6,018,408 | A | 1/2000 | Hong ....................... 359/201 |
| 6,140,979 | A | 10/2000 | Gerhard et al. ............ 345/7 |
| 6,304,237 | B1 | 10/2001 | Karakawa .................. 345/84 |
| 6,409,350 | B1 * | 6/2002 | Kakimoto et al. ........ 353/85 |
| 6,489,934 | B1 | 12/2002 | Klausner .................... 345/1.1 |
| 2002/0024495 | A1 | 2/2002 | Lippert et al. ............... 345/98 |
| 2002/0024708 | A1 | 2/2002 | Lewis et al. ................. 359/197 |

FOREIGN PATENT DOCUMENTS

| EP | 1 117 080 A2 | 7/2001 |
| JP | 2002-6397 | 1/2002 |
| JP | 2004-70298 | 3/2004 |
| WO | WO 03/005733 A1 | 1/2003 |
| WO | WO 2004/064410 A1 | 7/2004 |

* cited by examiner

*Primary Examiner*—Que T. Le
(74) *Attorney, Agent, or Firm*—Kirschstein et al.

(57) ABSTRACT

A method and apparatus are provided to controllably reduce power of a laser projection display (LPD) in response to detecting a variation in a viewing surface. During the operation of the LPD, a controller 142 monitors laser light being reflected from the viewing surface. Since the controller 142 "knows" the amount of power that the LPD is being instructed to deliver, it may compare the known power to the reflected laser light to determine if a foreign object may be in the path of the laser light, and therefore, affecting the magnitude of the laser light. The controller 142 responds to detecting such an event by reducing power to the lasers.

16 Claims, 4 Drawing Sheets

US 7,030,353 B2

METHOD AND APPARATUS FOR CONTROLLABLY REDUCING POWER DELIVERED BY A LASER PROJECTION DISPLAY

This Application claims the benefit of Provisional Application No. 60/534,008, filed Dec. 31, 2003.

BACKGROUND OF THE INVENTION

1. Field of the Invention

This invention relates generally to electronic displays, and, more particularly, to a laser projection display that detects changes to the viewing surface and reduces power delivered by the laser.

2. Description of the Related Art

In a laser projection device, one or more lasers are typically arranged to project a display onto a screen or other flat viewing surface. In order to produce a display having sufficient brightness for viewing in common ambient lighting conditions, the lasers must be capable of providing at least a preselected minimum level of power. In some applications, however, the space between the viewing surface and the lasers may be relatively open, and thus, objects or people may pass therebetween, exposing the objects and/or people to laser light. In such circumstances, FDA regulations (such as CDRH and/or IEC) apply, limiting the amount of power that a laser may deliver. The limited power levels are, however, generally insufficient to produce an adequately bright display.

The present invention is directed to overcoming, or at least reducing, the effects of one or more of the problems set forth above.

SUMMARY OF THE INVENTION

In one aspect of the instant invention, a method is provided for controlling a laser. The method comprises projecting laser light onto a viewing surface and monitoring laser light reflected from the viewing surface. The power delivered by the laser is controlled based on the reflected laser light.

BRIEF DESCRIPTION OF THE DRAWINGS

The invention may be understood by reference to the following description taken in conjunction with the accompanying drawings, in which like reference numerals identify like elements, and in which.

Figure 1:
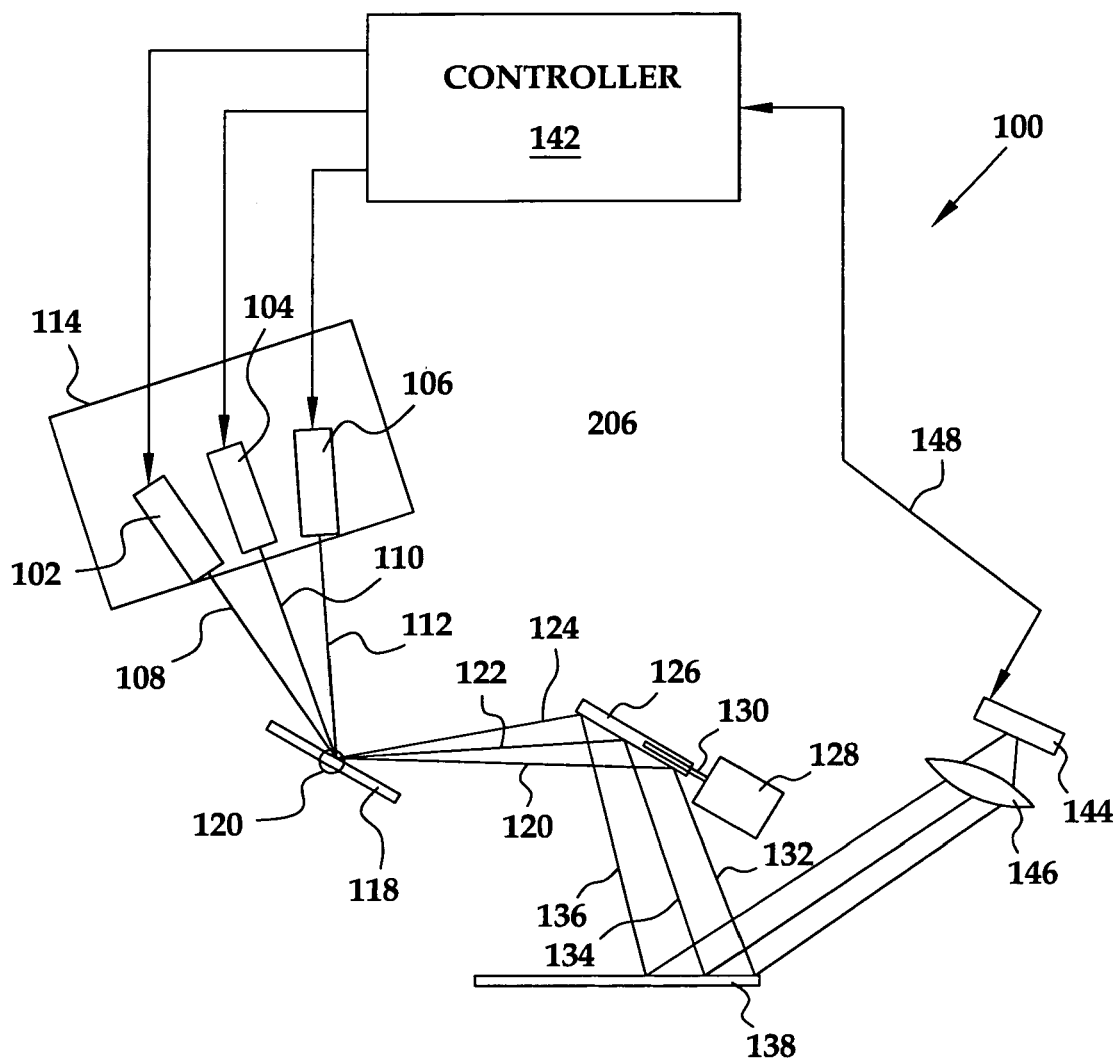
FIG. 1 is a stylistic block diagram of a top level view of one embodiment of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The following co-pending applications are hereby incorporated by reference herein in their entirety: Method and Apparatus for Aligning a Plurality of Lasers in an Electronic Display Device, by Mik Stern et. al.; Method and Apparatus for Displaying Information in Automotive Applications Using a Laser Projection Display, by Narayan Nambudiri et. al.; Method and Apparatus for Providing an Interface Between a Liquid Crystal Display Controller and a Laser Projection Display, by Narayan Nambudiri et. al.; A Color Laser Projection Display by Paul Dvorkis et. al.; Method and Apparatus for Capturing Images Using A Color Laser Projection Display, by Chinh Tan et. al.; Method and Apparatus for Conserving Power in a Laser Projection Display, By Fred Wood et. al.; A Laser Projection Display, by Ron Goldman et. al.; Method and Apparatus for Controllably Compensating for Distortions in a Laser Projection Display, by Carl Wittenberg et. al.; and Method and Apparatus for Controllably Modulating a Laser in a Laser Projection Display, by Dmitriy Yavid et. al.

Turning now to the drawings, and specifically referring to FIG. 1, a stylistic block diagram of a laser projection display (LPD) 100, in accordance with one embodiment of the present invention, is shown. In the illustrated embodiment, the LPD 100 includes three lasers 102, 104, 106, each capable of emitting a beam of light 108, 110, 112 consisting of a unique color, such as red, green or blue. Those skilled in the art will appreciate that the number of lasers and the color of light emitted therefrom may be varied without departing from the spirit and scope of the instant invention.

In one embodiment of the instant invention, the lasers 102, 104, 106 may be arranged in a common plane 114 with the beams of light 108, 110, 112 being angularly directed relative to one another to fall on a substantially common location 116 on a first scanning device, such as a first scanning mirror 118, from where they are reflected as beams of light 120, 122, 124. In other embodiments of the instant invention, the lasers 102, 104, 106 need not be arranged in a common plane, but rather may be angularly disposed in at least two dimensions with respect to the axis of rotation of the first scanning mirror 118. Deviations from the plane 114 may be compensated for by controlling the timing of the lasers 102, 104, 106, as discussed below.

In the illustrated embodiment, the first scanning mirror 118 oscillates on an axis 120 at a relatively high rate (e.g., about 20–30 KHz). Rotation or oscillation of the first scanning mirror 118 causes the beams of light 108, 110, 112 to be moved. That is, as the angular position of the first scanning mirror 118 alters, so to does the angle of reflection of the beams of light 120, 122, 124 from the first scanning mirror 118. Thus, as the mirror oscillates the reflected beams of light 120, 122, 124 are scanned to produce movement of the beams of light 120, 122, 124 along one component of the two-dimensional display.

The second component of the two-dimensional display is produced by a second scanning device, such as a mirror 126. In the illustrated embodiment, the second mirror 126 is coupled to a motor 128 at a pivot point 130 so as to produce rotational or oscillating movement about an axis that is substantially orthogonal to the axis of rotation of the first mirror 118. The beams of light 120, 122, 124 are reflected off of the second mirror 126 as beams of light 132, 134, 136 and directed to a viewing surface 138. The viewing surface 138 may take on any of a variety of forms without departing from the spirit and scope of the instant invention. For example, the viewing surface 138 may be a fixed screen that may be front or back lit by the lasers 102, 104, 106 and may be contained in a housing (not shown) that is common with the LPD 100, or alternatively, the viewing surface 138 may take the form of any convenient, generally flat surface, such as a wall or screen, spaced from the LPD 100.

Figure 2:
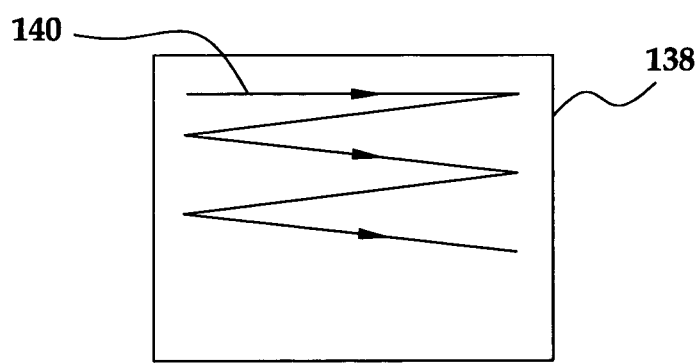
FIG. 2 is a stylistic view of a viewing surface shown in FIG. 1.

The second mirror 126 oscillates or rotates at a relatively slow rate, as compared to the rate of the first mirror 118 (e.g., about 60 hz). Thus, it will be appreciated that, as shown in FIG. 2, the beams of light 132, 134, 136 generally follow a path 140 on the display surface 138. Those skilled in the art will appreciate that the path 140 is similar in shape and concept to a raster scan commonly employed in cathode ray tube televisions and computer monitors.

While the instant invention is described herein in the context of an embodiment that employs separate first and second scanning mirrors 118, 126, those skilled in the art will appreciate that a similar path 140 may be produced by using a single mirror. The single mirror would be capable of being moved about two axis of rotation to provide the fast and slow oscillating movements along two orthogonal axes.

As is apparent from FIG. 1, owing to the angular positioning of the lasers 102, 104, 106, even though the lasers 102, 104, 106 have been arranged mechanically and optically to deliver the beams of light 108, 110, 112 within the same plane 114 and at the same point (on the rotational axis 120) on the mirror 118), each has a different angle of reflection, which causes the beams of light 120, 122, 124 to diverge. A controller 142 is provided to controllably energize the lasers 102, 104, 106 to effectively cause the beams of light 120, 122, 124 to be collinear, such that they may be reflected off of the second mirror 126 and delivered to the same point on the viewing surface 138 relatively independent of the distance of the viewing surface 138 from the second mirror 126.

Figure 3A:
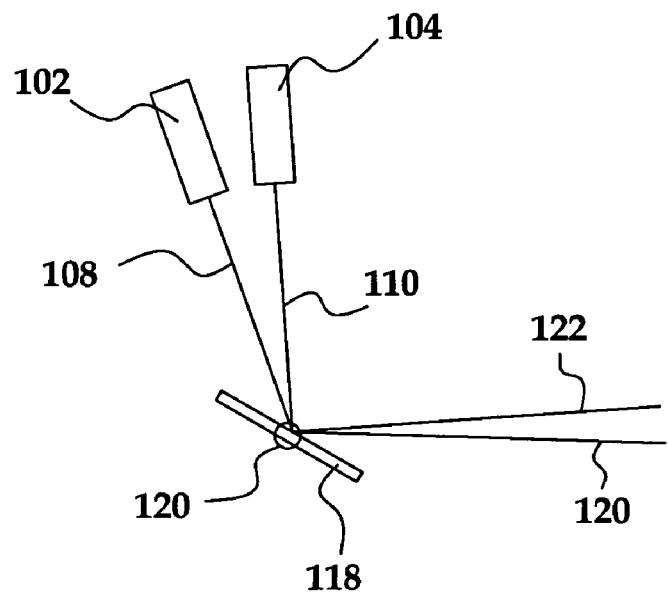
FIGS. 3A and 3B depict a top view of a scanning device at various times during its operation.
Figure 3B:
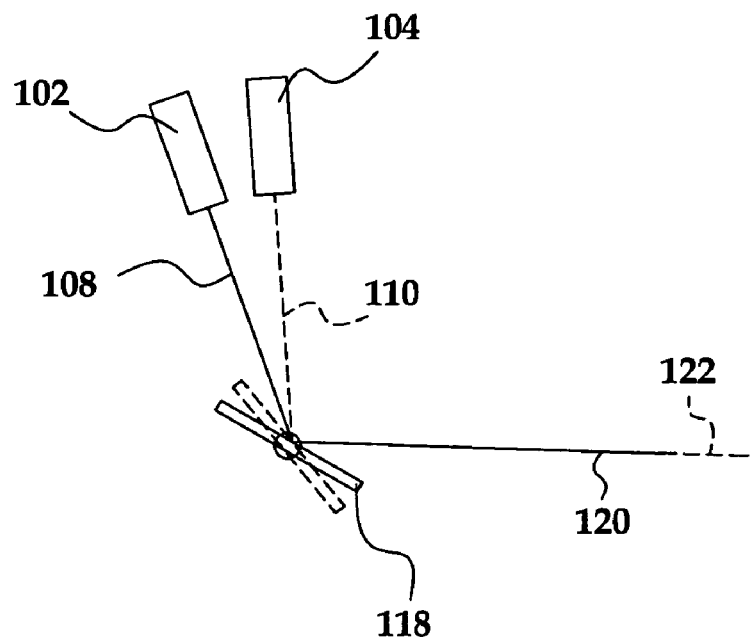

Turning now to FIGS. 3A and 3B, the operation of the controller 142 to cause the beams of light 120, 122, 124 to be collinear is discussed. To simplify the discussion, only two lasers 102, 104 are illustrated in FIG. 3, but those skilled in the art will appreciate that the concepts discussed herein may be extended to three or more lasers without departing from the spirit and scope of the instant invention. As shown in FIG. 3A, if the lasers 102, 104 are energized simultaneously, the reflected beams of light 120, 122 diverge. However, as shown in FIG. 3B, if the lasers 102, 104 are energized at slightly different times, then the beams of light 120, 122 can be made to follow a single, common path (i.e., the beams of light 120, 122 are collinear). For example, if the laser 102 is energized at a first time t1, then the mirror 118 will be at a first position, as represented by the solid lines, and the beam of light 108 will reflect off of the mirror 118 as the beam of light 120. Subsequently, if the laser 104 is energized at a second time t2, then the mirror 118 will be at a second position, as represented by the dashed lines, and the beam of light 110 will reflect off of the mirror 118 as the beam of light 122. By precisely controlling the time t2, the mirror 118 will be in a position to accurately reflect the beam of light 122 along substantially the same path as the beam of light 120.

Thus, through the operation of the controller 142, the beams of light 120, 122 are substantially collinear, but are slightly displaced in time. That is, the beams of light 120, 122 will now both be projected onto substantially the same point on the display surface 138, but at slightly different times. However, owing to the persistence of the human eye, the variation in timing is not detectable. That is, in the case of the three laser system described in FIG. 1, each of the lasers 102, 104, 106 will controllably deliver laser light of a unique color and intensity to substantially the same point on the viewing surface 138 within a relatively short window of time. The human eye will not detect the three separate colors, but rather will perceive a blending of the three light beams such that a consistent and desired hue appears at that point on the viewing surface. Those skilled in the art will appreciate that this process may be repeated numerous times along the path 140 to recreate a picture on the viewing surface 138.

A similar concept may be used to compensate for deviations arising in an alternative embodiment in which the lasers 102, 104, 106 are not located in the same plane 114. In this embodiment, the laser light produced by each of the lasers that ultimately reaches the viewing surface may be displaced vertically relative to one another. The controller 142 may compensate for this vertical displacement by energizing the offset laser on a prior or subsequent horizontal scan across the viewing surface, depending upon whether the vertical displacement is upward or downward. For example, assume that a second beam of light is displaced vertically above a first beam of light. Thus, on a first horizontal scan across the viewing surface, the laser associated with the second beam of light is energized. On a subsequent horizontal scan across the viewing surface, which is vertically lower than the previous horizontal scan, the laser associated with the first beam of light is energized so that both beams of light arrive at the same vertical location on the viewing screen, but slightly displaced in time.

Returning to FIG. 1, a photodetector 144 is arranged to receive laser light reflected from the viewing surface 138. The photodetector 144 may take any of a variety of forms, including a single photosensitive element or a plurality of photosensitive elements arranged in a grid. In some embodiments, it may be useful to include a mechanical/optical system 146 to focus the reflected laser light onto the photodetector 144.

The photodetector 144 is coupled to the controller 142 via a line 148. Signals indicative of the magnitude of the reflected laser light detected by the photodetector 144 may be communicated to the controller 142 over the line 148. In some instances, such as when the photodetector 144 is composed of a grid or an array of photosensitive elements, it may be useful to also convey information regarding the location of the reflected laser light. As discussed in more detail in conjunction with FIG. 4, the controller 142 may use the information regarding the magnitude of the reflected laser light to generally determine if conditions within the transmission path of the lasers have changed, such as by being interrupted by a person or object, or the viewing surface being altered. If such an event is detected, the operation of the lasers may be modified by, for example, substantially reducing the power delivered therefrom or by shutting them off.

Figure 4:
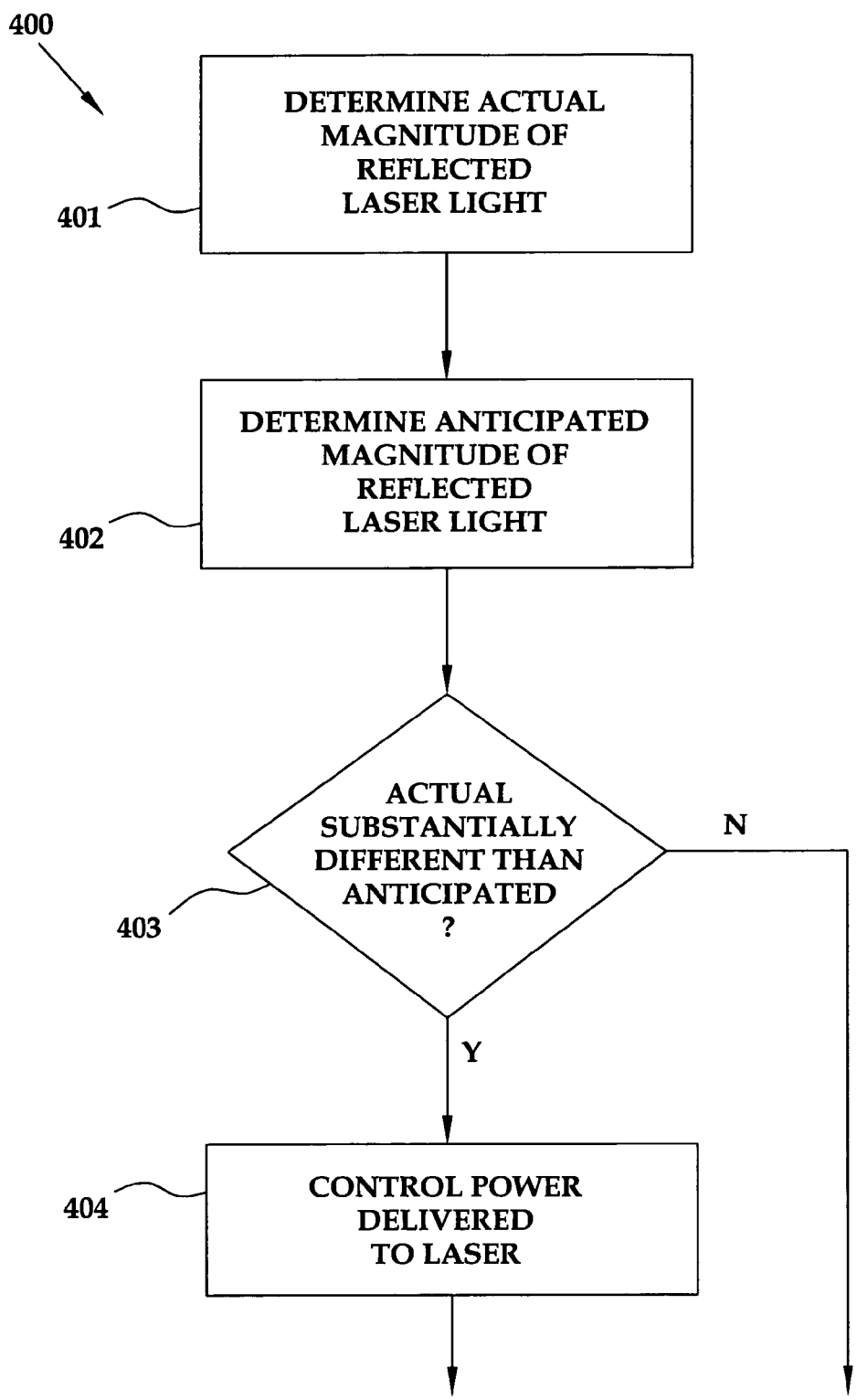
FIG. 4 depicts one embodiment of a flow chart of a control program that may executed by a controller shown in FIG. 1.

Turning now to FIG. 4, one embodiment of a control routine 400 that may be used in the controller 142 is illustrated. The routine begins at block 401 with the controller 142 using signals received from the photodetector 144 to determine the actual magnitude of the reflected laser light. In block 402, the controller determines the anticipated magnitude of the reflected laser light. That is, the controller 142 "knows" the amount of power that it has requested the lasers to deliver to the viewing surface. Thus, based on an algorithm, look-up table, or the like, the controller may arrive at a magnitude of the reflected laser light that it expects to be received by the photodetector 144. The controller 142 can use the anticipated magnitude to determine if a variation has occurred within the optical transmission path of the lasers. If the magnitude of the actual reflected laser light substantially coincides with the expected reflected laser light, then operation continues without modification. On the other hand, if the actual reflected laser light varies substantially from the anticipated reflected laser light, as determined at block 403, then the controller 142 may be instructed to control the power of the lasers (at block 404), such as by reducing the amount of power delivered therefrom. If the laser light is interrupted by a person or object, the amount of laser light reflected back to the photodetector 144 may vary substantially. In some instances, the actual laser light reflected back to the photodetector 144 may be substantially reduced; however, in other circumstances, the actual laser light reflected back to the photodetector 144 may be substantially increased. In either case, the controller 142 may elect to reduce power from the lasers, or in some instances to shut them off.

Any of a variety of actions may be taken by the controller 142 in response to detecting a substantial variation in the actual reflected laser light. For example, the controller 142 may elect to reduce or even eliminate power for all three lasers over the entire viewing surface. Alternatively, the controller 142 may be programmed to reduce or eliminate power in only those regions where a variation in reflectivity is detected. Further, the controller 142 may be programmed to reduce or eliminate power in those regions where a variation in reflectivity is detected plus an additional buffer area surrounding those area where the variation in reflectivity is detected.

In some embodiments, it may be useful to continue to supply at least some power to the lasers so that they may be used to display an error message. The error message may include information on how to reset or restore normal operation to the LPD. For example, a message such as, "Please aim your display at a uniform background for proper operation," may be displayed.

Figure 5:
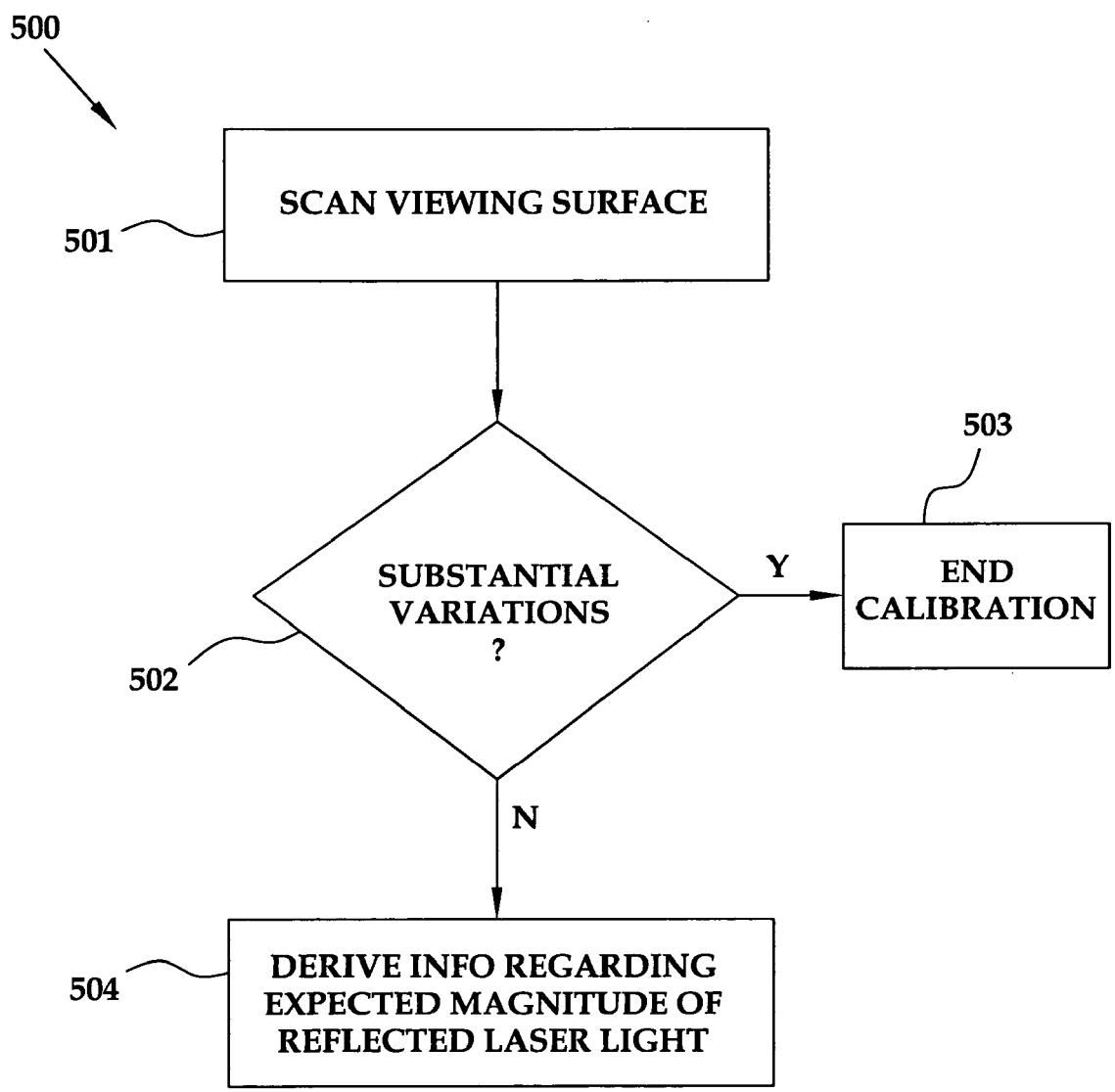
FIG. 5 depicts one embodiment of a flow chart of a calibration routine that may executed by a controller shown in FIG. 1.

For the controller 142 to determine the anticipated magnitude of the reflected laser light (as discussed above with respect to block 402 of FIG. 5), it may be useful to perform a calibration process when the LPD is first turned on. One embodiment of a calibration process 500 that may be performed by the controller 142 is set forth in the flow chart of FIG. 5. The calibration process begins at block 501, with the controller 142 turning the lasers on for a short period of time, such as a period of time sufficient to scan at least a substantial portion of the viewing surface 138 at least one time. This first calibration scan may be accomplished with the lasers operating at relatively low power. The controller 142 receives feedback signals from the photodetector 144, indicating at least two types of useful information. First, the controller 142 can determine if the LPD is directed to a relatively uniform viewing surface by monitoring the signals delivered by the photodetector 144 for any substantial variations (at block 502). If substantial variations are detected, the controller 142 may discontinue the calibration process (at block 503) and display a message, such as, "Please aim your display at a uniform background for proper operation."

On the other hand, if the variations are sufficiently small, then the calibration process may be allowed to continue. At block 504, the controller 142 may derive information regarding the expected magnitude of the reflected laser light at other power levels based on the detected magnitude of the reflected laser light in the first calibration pass. For example, the controller may derive a formula that correlates the magnitude of the transmitted power level with the magnitude of the reflected laser light. The relationship may vary from a simple mathematical approximation based on an average ratio of the total laser light to a more complex algorithm that attempts to account for variations in reflectivity for each color of laser light. Alternatively, a more empirical approach may be had by performing additional scans at varying power levels. These additional scans may be recorded in a series of look-up tables that the controller 142 may later access to estimate the expected magnitude of the reflected laser light. The controller 142 may access the table that most closely matches the current operating conditions of the lasers, or the controller 142 may include algorithms for interpolating between the tables.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system's memories or registers or other such information storage, transmission or display devices.

Those skilled in the art will appreciate that the various system layers, routines, or modules illustrated in the various embodiments herein may be executable control units. The control units may include a microprocessor, a microcontroller, a digital signal processor, a processor card (including one or more microprocessors or controllers), or other control or computing devices. The storage devices referred to in this discussion may include one or more machine-readable storage media for storing data and instructions. The storage media may include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy, removable disks; other magnetic media including tape; and optical media such as compact disks (CDs) or digital video disks (DVDs). Instructions that make up the various software layers, routines, or modules in the various systems may be stored in respective storage devices. The instructions when executed by the control units cause the corresponding system to perform programmed acts.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. Consequently, the method, system and portions thereof and of the described method and system may be implemented in different locations, such as the wireless unit, the base station, a base station controller and/or mobile switching center. Moreover, processing circuitry required to implement and use the described system may be implemented in application specific integrated circuits, software-driven processing circuitry, firmware, programmable logic devices, hardware, discrete components or arrangements of the above components as would be understood by one of ordinary skill in the art with the benefit of this disclosure. It is therefore evident that the particular embodiments disclosed above may be altered or modified and all such variations are considered within the scope and spirit of the invention. Accordingly, the protection sought herein is as set forth in the claims below.

We claim:

1. An arrangement for controlling power during projection of an image on a projection surface, comprising:
   a) an energizable laser source for energizing a laser beam;
   b) a controller for energizing the laser source to emit the laser beam at a reference power level during a calibration mode, and at a display power level during a display mode;
   c) an image projector for sweeping the laser beam along mutually orthogonal directions across the projection surface at the reference power level to scan the projection surface during the calibration mode, and at the display power level to project the image on the projection surface during the display mode;
   d) a detector for detecting a reference detected level of light reflected from the projection surface during the calibration mode, and for detecting an actual detected level of light reflected from the projection surface during the display mode; and
   e) the controller being operative for controlling the energizing of the laser source when the detected levels of the light reflected from the projection surface are different.

2. The arrangement of claim 1, wherein the laser source is a laser, and wherein the image projector includes a first oscillatable scan mirror for sweeping the laser beam from the laser as a scan line extending along one of the directions, and a second oscillatable scan mirror for sweeping the scan line along the other of the directions to generate a raster pattern of scan lines.

3. The arrangement of claim 1, wherein the laser source includes a plurality of lasers for respectively emitting constituent beams that are combined to form the laser beam, and wherein the image projector includes a first oscillatable scan mirror for sweeping the laser beam as a scan line extending along one of the directions, and a second oscillatable scan mirror for sweeping the scan line along the other of the directions to generate a raster pattern of scan lines.

4. The arrangement of claim 3, wherein the controller is operative for at least partially deenergizing at least one of the lasers when the detected levels are different.

5. The arrangement of claim 1, wherein the controller is operative for at least partially deenergizing the laser source when the detected levels are different.

6. The arrangement of claim 1, wherein the controller is operative for fully deenergizing the laser source when the detected levels are different.

7. The arrangement of claim 1, wherein the image projector is operative for projecting an error message as the image when the detected levels are different.

8. The arrangement of claim 1, wherein the controller is operative for energizing the laser source during the calibration mode at different reference power levels.

9. A method of controlling power during projection of an image on a projection surface, comprising the steps of:
   a) energizing a laser beam from an energizable laser source;
   b) energizing the laser source to emit the laser beam at a reference power level during a calibration mode, and at a display power level during a display mode;
   c) sweeping the laser beam along mutually orthogonal directions across the projection surface at the reference power level to scan the projection surface during the calibration mode, and at the display power level to project the image on the projection surface during the display mode;
   d) detecting a reference detected level of light reflected from the projection surface during the calibration mode, and detecting an actual detected level of light reflected from the projection surface during the display mode; and
   e) controlling the energizing of the laser source when the detected levels of the light reflected from the projection surface are different.

10. The method of claim 9, wherein the laser source is a laser, and wherein the sweeping is performed by oscillating a first scan mirror for sweeping the laser beam from the laser as a scan line extending along one of the directions, and by oscillating a second scan mirror for sweeping the scan line along the other of the directions to generate a raster pattern of scan lines.

11. The method of claim 9, wherein the laser source includes a plurality of lasers for respectively emitting constituent beams that are combined to form the laser beam, and wherein the sweeping is performed by oscillating a first scan mirror for sweeping the laser beam as a scan line extending along one of the directions, and by ocsillating a second scan mirror for sweeping the scan line along the other of the directions to generate a raster pattern of scan lines.

12. The method of claim 11, wherein the controlling step is performed by at least partially deenergizing at least one of the lasers when the detected levels are different.

13. The method of claim 9, wherein the controlling step is performed by at least partially deenergizing the laser source when the detected levels are different.

14. The method of claim 9, wherein the controlling step is performed by fully deenergizing the laser source when the detected levels are different.

15. The method of claim 9, wherein the sweeping step is performed by projecting an error message as the image when the detected levels are different.

16. The method of claim 9, wherein the energizing step is performed by energizing the laser source during the calibration mode at different reference power levels.

* * * * *